US007856280B2

(12) United States Patent
Grott et al.

(10) Patent No.: US 7,856,280 B2
(45) Date of Patent: Dec. 21, 2010

(54) PROCESS CONTROL AND OPTIMIZATION TECHNIQUE USING IMMUNOLOGICAL CONCEPTS

(75) Inventors: Jeffrey J. Grott, Irwin, PA (US); Jeffery J. Williams, Mckees Rocks, PA (US); Konrad Świrski, Warsaw (PL); Tomasz Chomiak, Warsaw (PL); Konrad Wojdan, Warsaw (PL)

(73) Assignee: Emerson Process Management Power & Water Solutions, Inc., Pittsburgh, PA (US)

( * ) Notice: Subject to any disclaimer, the term of this patent is extended or adjusted under 35 U.S.C. 154(b) by 206 days.

(21) Appl. No.: 11/497,839

(22) Filed: Aug. 2, 2006

(65) Prior Publication Data

US 2008/0125881 A1 May 29, 2008

(51) Int. Cl.
*G05B 13/02* (2006.01)
*G05B 13/00* (2006.01)
(52) U.S. Cl. .......................... 700/28; 700/29; 700/30; 700/31; 700/32; 318/516
(58) Field of Classification Search ............. 700/28–34
See application file for complete search history.

(56) References Cited

U.S. PATENT DOCUMENTS

| 5,453,925 | A | * | 9/1995 | Wojsznis et al. | ............... | 700/37 |
| 5,568,378 | A | | 10/1996 | Wojsznis | | |
| 5,704,011 | A | * | 12/1997 | Hansen et al. | ................. | 706/25 |
| 5,838,561 | A | * | 11/1998 | Owen | .......................... | 700/32 |
| 6,055,483 | A | * | 4/2000 | Lu | ............................... | 702/31 |
| 6,122,555 | A | * | 9/2000 | Lu | ................................ | 700/9 |

(Continued)

FOREIGN PATENT DOCUMENTS

GB        2 419 438        4/2006

(Continued)

OTHER PUBLICATIONS

Wojdan et al., "Sztuczny System Immunologiczny Jako Optymalizator Procesu Spalania (Optimization of Combustion in a Boiler Using Immunity System)," Prace Naukowe Konferencje z.24, pp. 53-62 (2005).

(Continued)

*Primary Examiner*—Albert DeCady
*Assistant Examiner*—Sunray R Chang
(74) *Attorney, Agent, or Firm*—Marshall, Gerstein & Borun LLP

(57) ABSTRACT

An integrated optimization and control technique performs process control and optimization using stochastic optimization similar to that used in biological immune systems during on-line operation of a process, the technique collects and stores indications of process control states. During steady-state operation, the technique optimizes process operation by developing sets of process control inputs from stored process control states using an objective function that defines an optimality criterion. Moreover, after one or more disturbance inputs experiences a significant change, the technique responds by comparing the changed disturbance inputs to the disturbance inputs of at least some of the stored process control states to determine the stored process control states that are closest to the new process operating condition. The technique then develops a new set of control inputs based on the control inputs associated with the stored process control states determined to be closest to the new process operating condition.

33 Claims, 3 Drawing Sheets

U.S. PATENT DOCUMENTS

| | | | |
|---|---|---|---|
| 6,381,504 B1 * | 4/2002 | Havener et al. | 700/44 |
| 6,577,908 B1 | 6/2003 | Wojsznis et al. | |
| 6,723,805 B2 * | 4/2004 | Braganca et al. | 526/61 |
| 6,745,088 B2 * | 6/2004 | Gagne | 700/29 |
| 6,833,054 B2 * | 12/2004 | Lahtinen et al. | 162/49 |
| 6,970,750 B2 | 11/2005 | Wojsznis et al. | |
| 7,050,863 B2 | 5/2006 | Mehta et al. | |
| 7,113,834 B2 | 9/2006 | Wojsznis et al. | |
| 7,272,454 B2 | 9/2007 | Wojsznis et al. | |
| 7,317,953 B2 | 1/2008 | Wojsznis et al. | |
| 7,599,750 B2 * | 10/2009 | Piche | 700/36 |
| 2003/0028268 A1 | 2/2003 | Eryurek et al. | |
| 2003/0105247 A1 * | 6/2003 | Braganca et al. | 526/61 |
| 2007/0168057 A1 | 7/2007 | Blevins et al. | |

FOREIGN PATENT DOCUMENTS

| | | |
|---|---|---|
| WO | WO-2007/067645 | 6/2007 |

OTHER PUBLICATIONS

Search Report for Application No. GB0715010.5, dated Nov. 12, 2007.

Chinese Office Action for corresponding Application No. 200710138038.5, dated Feb. 12, 2010.

English language translation of Wojdan et al., "Sztuczny System Immunologiczny Jako Optymalizator Procesu Spalania (Optimization of Combustion in a Boiler Using Immunity System)," Prace Naukowe Konferencje z.24, pp. 53-62 (Dec. 2005).

* cited by examiner

PROCESS CONTROL AND OPTIMIZATION TECHNIQUE USING IMMUNOLOGICAL CONCEPTS

FIELD OF TECHNOLOGY

The present invention relates generally to process control systems and, more particularly, to the use of optimization techniques for controlling and optimizing the operation of a process, such as an energy or power generation process.

DESCRIPTION OF THE RELATED ART

Process control systems, such as distributed or scalable process control systems like those used in power generation, chemical manufacturing, petroleum processing or other processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses to the field devices to control the operation of the plant. Information from the field devices and the controller is typically made available to one or more applications executed by the operator workstation to enable an operator to perform any desired function with respect to the process, such as viewing the current state of the process, modifying the operation of the process, etc.

Process controllers are typically programmed to execute different algorithms, sub-routines or control loops (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and a single output block, such as an analog output (AO) function block. These control loops typically perform single-input/single-output control because the control block creates a single control output used to control a single process input, such as a valve position, etc. However, in certain cases, such as in complex energy generation plants, like coal burning power plants, the use of a number of independently operating, single-input/single-output control loops is not very effective because the process variables being controlled are affected by more than a single process input and, in fact, each process input may affect the state of many process outputs. In this case, using a number of single-input/single-output control loops may lead to non-optimal control, resulting in the consumption of more raw material than necessary, a lower quality product, more emissions than necessary, less efficiency, etc.

To overcome the deficiencies of single loop control, a number of types of multivariable or multiple-input/multiple-output control have been developed which operate to simultaneously produce a set of control signals from a set of process variables and set points. In most cases, these control procedures rely on a process model of some kind to model the process reaction to a given set of inputs. One simple multi-variable control method uses a mathematical model for the process, such as a first order mathematical model of the process model. However, it has been found that these theoretical models are simply not detailed enough to allow precise or optimal control as the theoretical models do not account for many of the variables which affect the process, do not account for deterioration of the plant equipment, etc. Thus, none of model-based control solutions which apply a strictly theoretical model (i.e., without the use of historical process data) have been able to obtain precise or optimal control results.

Other multi-variable control methods use plant models developed from historical data collected from the plant itself to better model the plant as actually configured. Examples of these plant based model control techniques include model predictive control (MPC), and neural network control. In the past, MPC and other types of advanced control have been used to perform control in situations in which changes to a particular controlled process variable affects more than one process variable or output. Since the late 1970s, many successful implementations of model predictive control have been reported, and MPC has become the primary form of advanced multivariable control in the process industry. Still further, MPC has been implemented within distributed control systems as distributed control system layered software.

Generally speaking, MPC is a multiple-input/multiple output control strategy in which the effects of changing each of a number of process inputs on each of a number of process outputs is measured, and these measured responses are then used to create a control matrix or a model of the process. The process model or control matrix (which generally defines the steady state operation of the process) is inverted mathematically and is used in a multiple-input/multiple-output controller to control the process outputs based on changes made to the process inputs. In some cases, the process model is represented as a process output response curve (typically a step response curve) for each of the process inputs and these curves may be created based on a series of, for example, pseudo-random step changes delivered to each of the process inputs. These response curves can be used to model the process in known manners. Model predictive control is known in the art and, as a result, the specifics thereof will not be described herein. For example, U.S. Pat. Nos. 4,616,308 and 4,349,869 generally describe MPC controllers that can be used within a process control system.

MPC has also been found to be an effective and useful control technique when used in conjunction with process optimization. In this case, an optimizing function may calculate the costs and/or profits associated with each of the constrained or auxiliary (also called disturbance) variables to operate at a level in which profit is maximized, costs are minimized, etc. Measurements of these auxiliary variables can then be provided as inputs to the MPC routine and treated by the MPC routine as control variables having a set point equal to the operational point for the auxiliary variable defined by the optimization routine. More particularly, to optimize a process which uses MPC, an optimizer may minimize or maximize one or more process input variables determined by the MPC routine so as to cause the process to run at an optimal point. While this technique is computationally possible, it is necessary to select the process variables that have, for example, a significant impact on improving the economic operation of the process (e.g. process throughput or quality) to optimize the process from an economic standpoint. Operating the process at an optimal point from a financial or economic viewpoint typically requires controlling many process variables in conjunction with one another, not just a single process variable. Optimizing with the use of quadratic programming techniques or more current techniques like interior point methods has been proposed as a solution to providing dynamic optimization with MPC. With these methods, an optimization solution is determined and the optimizer provides the controller with moves in the controller outputs (i.e., the manipulated variables of the process), taking into account process dynamics, current constraints and optimization objectives. However, this approach places a tremendous computational burden on the controller and is not generally very feasible at the current technology level.

Unfortunately, every control solution which uses a process model developed from historical data requires a set of parametric tests to be run on the process plant itself prior to on-line operation of the process (i.e., using the control technique that relies on the process model) to develop the process model in the first place. Moreover, these parametric tests must be re-run each time the process changes to update the process model. Such tests in a power or energy generation plant may take the form of, for example, tests of boiler operation at a varied combination of control variables relating to the precise mixture of air and fuel such as a combination of operating fuel delivery and coal mill systems, opening of secondary air and OFA (over fire air, which is an additional air source used to reduce emissions on coal, gas and oil fired boilers), burner tilt angles, etc. Thus, to obtain a useful model, various tests must be run to obtain process response data at a large number of combinations of the various possible process parameters. Moreover, the number of required tests increases as the number of plant variables increases. Moreover, the usefulness of the process model is constrained by the number and types of tests performed when generating the process model, as the process model may not be accurate outside of the process operational conditions simulated with the test. In any event, depending on the type of boiler and the number and type of control variables that apply, the tests used to develop an adequate process model can take several days, employing large engineering measures and restricting production capacity of the plant. Additionally, while the cost of the computer equipment used to obtain and store the process model data is insignificant, the cost of the time associated with having a highly qualified engineering team perform and analyze the tests can be significant within a power plant budget.

Still further, there are difficulties with obtaining a robust process model during the process mapping process, as to be robust, the process model must cover the range of process conditions that may occur when uncontrolled or unaccounted for changes in the plant occur. For example, in a combustion based energy plant, the combustion process typically changes with increased or prolonged boiler operation due to the changes over time in the boiler operating parameters and the due to the deterioration of plant equipment. Of course, it is difficult if not impossible to model or simulate these changes (before they occur) when creating a process model. Still further, historical based process model generation methods are not able to sufficiently consider or account for the changes of non-measured process values, or changes in process parameters which are difficult to measure (due to the state of measurement technology) but which, non-the-less, affect process operation. An example of such a process variable in a combustion plant includes the quality parameters of the coal used during the testing process, which parameters are typically only determined in a laboratory once a day, and are not therefore considered when defining the quality index (used in the objective function for an optimization task) and are not considered in modeling the content of the combustible elements present in the slag and fly-ash (emissions) produced as a result of the combustion process.

It is believed that it is not actually possible to eliminate the above mentioned drawbacks using the theoretical or historical based process models currently available in known process control techniques. Thus, a different process modeling and control technique is needed, in which a process controller operates effectively in response to changing process plant conditions and in response to unmeasured variables, but which does not require a lot of training and modeling expenses to create.

SUMMARY

An integrated optimization and control technique performs process control and optimization using stochastic optimization similar to the manner in which biological immune systems work, and thus without the use of historical process models that must be created prior to placing the control and optimization routine in operation within a plant. In particular, an integrated optimization and control technique collects various indications of process control states during the on-line operation of the process, and stores these process control state indications within a memory. Each of the process control states may include, for example, a set of process input values and a set of process output values. The process input values may include process control inputs as well as measured and unmeasured disturbance inputs, while the process output values may include process variable values, such as steady-state process variable values which result from the application of the process inputs to the process.

During steady-state operation of the process, the integrated optimization and control technique attempts to optimize the process operation (i.e., to move the process towards a more optimal state or condition) by developing a series of sets of process control inputs to be provided to the process. Generally speaking, the integrated optimization and control technique develops the series of sets of process control inputs using the stored process control states, and the series of sets of process control inputs are generally selected or determined in an attempt to minimize (or maximize) an objective function that defines a particular optimality criteria to be used in optimizing the operation of the process. To perform this function, the inputs (such as the disturbance inputs) of the current process control state (i.e., the current operating condition of the process) may be used to select one or more of the stored process control states, and the series of set of process control inputs to be delivered to the process may be determined as a function of the process control inputs of the selected process control states. In one embodiment, the stored process control states having a set of disturbance inputs that are closest or most similar to the disturbance inputs associated with the current process control state may be selected as the appropriate set of process control states to be used in determining the series of sets of process control inputs. In another embodiment, one or more of the stored process control states may be used to develop one or more mathematical models of the process, and the series of sets of process control inputs may be ascertained using these process models.

Additionally, the integrated optimization and control technique may respond to a significant change in the current process operating condition by determining a new set of process control inputs to provide to the process based on one or more of the stored process control states. In particular, the optimization and control technique may compare the disturbance inputs of the current process control operating condition, after one or more of these disturbance inputs experiences a significant change, to the disturbance inputs of at least some of the stored process control states to determine the one or more of the stored process control states that is/are closest to the new process operating condition. The integrated optimization and control technique may then develop the new set of control inputs to be delivered to the process based on the control inputs associated with the one or more stored process control states determined to be closest to the new process operating condition.

Thus, in one embodiment, a process control system for controlling a process includes a controller adapted to use a set of target control signal values to produce one or more process control signals for use in controlling one or more field devices within the process, and an optimizer communicatively coupled to the controller and adapted to develop the set of target control signal values. The optimizer may include a memory for storing a plurality of process control states and an optimization unit communicatively coupled to the memory and adapted to use the stored plurality of process control states to develop a series of target control signal values for use by the controller during steady-state operation of the process to drive the process towards an optimal process operating condition. Moreover, the optimizer may include a change detection unit that is responsive to one or more process inputs, such as the disturbance inputs associated with the process, to detect a change in a current process state condition. The optimizer may also include a response unit that responds to a detected change in the current process state condition by selecting one or more of the stored plurality of process control states and using the selected one or more of the stored plurality of process control states to produce a new set of target control signal values for use by the controller in responding to the change in the current process state condition.

If desired, each of the process control states stored in the memory may be defined by a set of process inputs (which may be control inputs and measured and un-measured disturbance inputs) as well as a set of process outputs that result from the application of the set of process inputs. Thus, each of the process control states defines the state of the process, and preferably the steady state operational state of the process, in response to a given set of process inputs. As a result, each of the process control states represents or inherently includes a model of the process at a particular time during process operation. If desired, the optimizer may include a model creation unit that creates one or more process models, such as mathematical process models, from one or more of the stored process control states. In this case, the optimizer may use the determined mathematical process models to produce an estimate of the process outputs based on a proposed set of process control inputs, or may use the mathematical process models to determine a proposed set of process control inputs that should be used to produce a predicted or desired set of process outputs, given the current set of process disturbance inputs. Likewise, if desired, the optimization unit may include an objective function and may use the objective function to determine a comparative optimality of two or more process control states to develop target control signals predicted to drive the process towards an optimal process operating condition. If desired, this objective function may be user-definable to enable the optimality criteria to be changed.

Still further, the optimizer may include a process control state manager, which operates to control or limit the number of process control states stored in the memory, to thereby increase the efficiency or effectiveness of the optimizer when the process has been operating for a significant period of time. In particular, the process control state manager may be programmed or adapted to remove one or more of the stored process control states based on the length of time that these process control states have been stored in the memory, as older process control states may no longer accurately reflect the current operation of the process due to changed process parameters, degradation of plant equipment, etc. Likewise, if desired, the process control state manager may be adapted to remove one or more of the stored process control states based on an indication or measure of the amount of usage of the one or more of the process control states by the optimization unit and/or by the response unit or based on an optimality or quality factor associated for the process control state.

According to another embodiment, a method of controlling a process includes determining values for a set of process input and output variables at multiple times during ongoing operation of the process to determine a multiplicity of process control states, storing an indication of each of the process control states, and when the process is not experiencing a significant change in one or more process disturbances, optimizing the operation of the process by periodically providing new control inputs to the process. In this case, the new control inputs may be configured or may be determined to move the process to a more optimal process control state as measured by an objective function which considers or weights both process control inputs and process control outputs. However, when the process experiences a significant change in one or more process disturbances, the method determines a set of control inputs to be provided to the process based on one or more of the stored process control states and controls the process using the set of control inputs to move the process towards a more optimal process control state in response to the significant change in the one or more process disturbances.

According to this method, determining the set of process control inputs to be provided to the process based on the stored process control states may be performed by comparing the process control state of the process after the process experiences a significant change in a process disturbance, to the stored process control states, and selecting one or more of the stored process control states based on the comparison.

According to a still further embodiment, a method of optimizing the operation of a process includes determining a multiplicity of process control states during ongoing operation of the process by determining values for each of a set of process inputs and a set of process outputs that result from the set of process inputs being applied to the process to thereby define a particular process control state. The method stores an indication of each of the multiplicity of process control states in a memory, and periodically determines a new set of process control inputs to be used to control the process by predicting the response of the process to a proposed set of process control inputs based on the stored process control states. The method may further analyze the optimality of a proposed set of process control inputs using an optimality criteria that uses both the proposed set of process control inputs and a set of predicted process control outputs that result from applying the proposed set of process control inputs to the process.

In accordance with another preferred embodiment, a method of controlling a process includes determining a multiplicity of process control states during ongoing operation of the process by determining values for each of a set of process inputs and a set of process outputs that result from the set of process inputs being applied to the process to thereby define a particular process control state. The method stores an indication of each of the multiplicity of process control states in a memory and monitors the current state of the process to determine when the process experiences a significant change. When the process experiences a significant change, the method determines a set of control inputs to be provided to the process based on one or more of the stored process control states and controls the process using the determined set of control inputs to move the process towards a more optimal process control state in response to the significant change.

DETAILED DESCRIPTION

Figure 1:
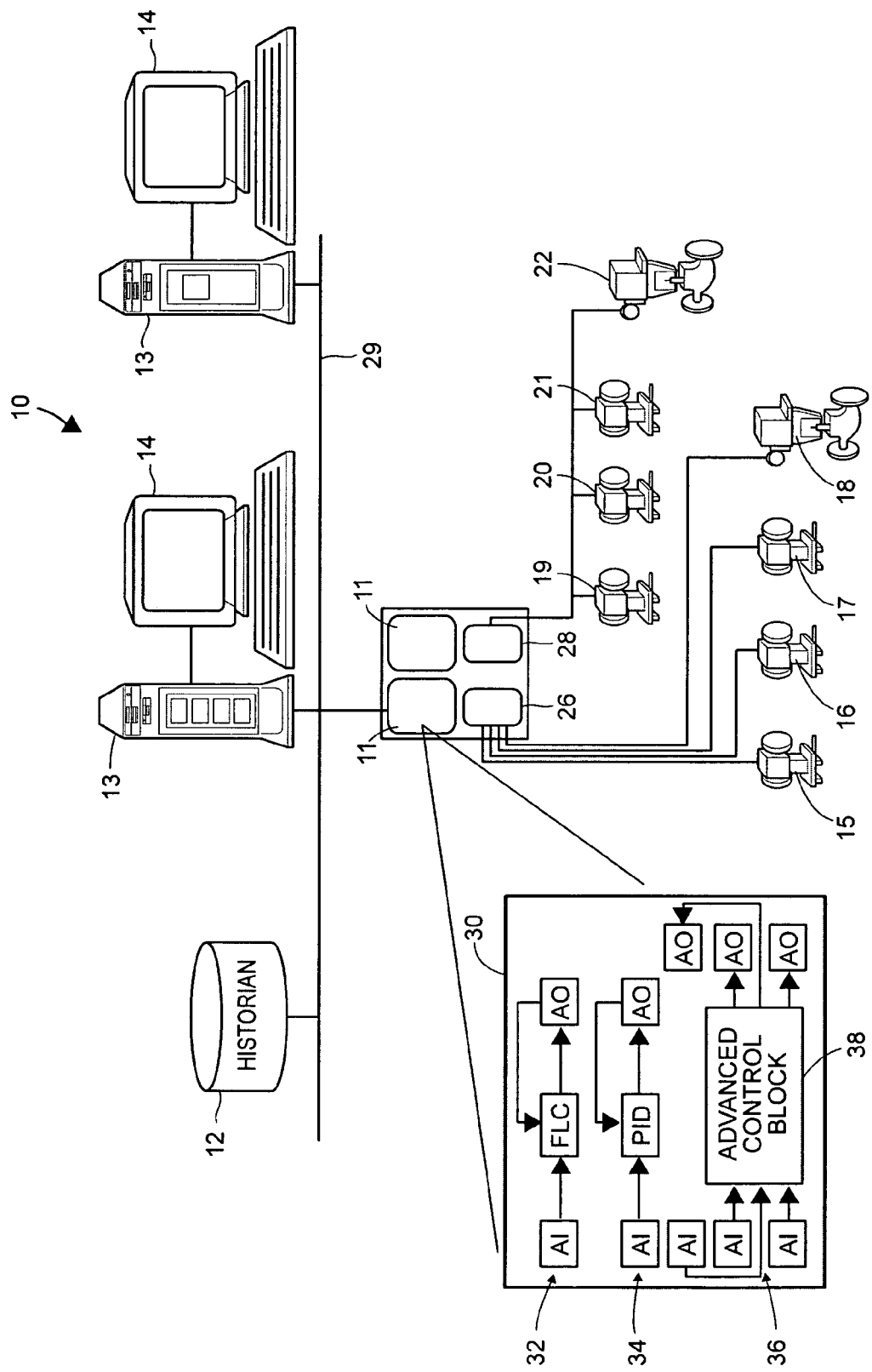
FIG. 1 is a block diagram of a process control system including a control module having an advanced controller function block that performs integrated optimization and control using the artificial immune system concepts described herein.

Referring now to FIG. 1, a process control system 10 includes a process controller 11 communicatively connected to a data historian 12 and to one or more host workstations or computers 13 (which may be any type of personal computers, workstations, etc.), each having a display screen 14. The controller 11 is also connected to field devices 15-22 via input/output (I/O) cards or devices 26 and 28. The data historian 12 may be any desired type of data collection unit having any desired type of memory and any desired or known software, hardware or firmware for storing data and may be separate from (as illustrated in FIG. 1) or a part of one of the workstations 13. The controller 11, which may be, by way of example, the Ovation® controller sold by Emerson Process Management Power and Water Solutions, is communicatively connected to the host computers 13 and to the data historian 12 via, for example, an Ethernet connection or any other desired communication network 29. The communication network 29 may be in the form of a local area network (LAN), a wide area network (WAN), a telecommunications network, etc. and may be implemented using hardwired or wireless technology. The controller 11 is communicatively connected to the field devices 15-22 using any desired hardware and software associated with, for example, standard 4-20 ma devices and/or any smart communication protocol such as the FOUNDATION® Fieldbus protocol (Fieldbus), the HART protocol, etc.

The field devices 15-22 may be any types of devices, such as sensors, valves, transmitters, positioners, switches, etc. while the I/O cards 26 and 28 may be any types of I/O devices conforming to any desired communication or controller protocol. In the embodiment illustrated in FIG. 1, the field devices 15-18 are standard 4-20 ma devices that communicate over analog lines to the I/O card 26 while the field devices 19-22 are smart devices, such as Fieldbus field devices, that communicate over a digital bus to the I/O card 28 using Fieldbus protocol communications. Of course, the field devices 15-22 could conform to any other desired standard(s) or protocols, including any standards or protocols developed in the future.

The controller 11, which may be one of many distributed controllers within the plant 10 having at least one processor therein, implements or oversees one or more process control routines, which may include control loops, stored therein or otherwise associated therewith. The controller 11 also communicates with the devices 15-22, the host computers 13 and the data historian 12 to control a process in any desired manner. It should be noted that any control routines or elements described herein may have parts thereof implemented or executed by different controllers or other devices if so desired. Likewise, the control and optimization routines or elements described herein to be implemented within the process control system 10 may take any form, including software, firmware, hardware, etc. For the purpose of this discussion, a process control element can be any part or portion of a process control system including, for example, a routine, a block or a module stored on any computer readable medium. Control and optimization routines, which may be modules or any part of a control or optimization procedure such as a subroutine, parts of a subroutine (such as lines of code), etc. may be implemented in any desired software format, such as using ladder logic, sequential function charts, function block diagrams, object oriented programming or any other software programming language or design paradigm. Likewise, the control and optimization routines described herein may be hard-coded into, for example, one or more EPROMs, EEPROMs, application specific integrated circuits (ASICs), programmable logic controllers (PLCs) or any other hardware or firmware elements. Still further, the control and optimization routines may be designed using any design tools, including graphical design tools or any other type of software/hardware/firmware programming or design tools. Thus, the controller 11 may be configured to implement a control strategy or a control and/or optimization routine in any desired manner.

In one embodiment, the controller 11 implements a control strategy using what are commonly referred to as function blocks, wherein each function block is a part or object of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which may be the case with Fieldbus devices. While the description of the control system is provided herein using a function block control strategy which uses an object oriented programming paradigm, the control strategy or control loops or modules could also be implemented or designed using other conventions, such as ladder logic, sequential function charts, etc. or using any other desired programming language or paradigm.

As illustrated by the expanded block 30 of FIG. 1, the controller 11 may include or implement a number of single-loop control routines, illustrated as routines 32 and 34, and may implement one or more advanced control loops, illustrated as control loop 36. Each such loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including a multi-variable control block 38 having inputs communicatively connected to numerous AI function blocks and outputs communicatively connected to numerous AO function blocks, although the inputs and outputs of the multivariable control block 38 may be communicatively connected to any other desired function blocks or control elements to receive other types of inputs and to provide other types of control outputs. As will be described further, the multivariable control block 38 may be an integrated control and optimization block that integrates an immunological response to perform optimized control of the process or a portion of the process, which in this case may be an energy generation unit, such as a coal burning power plant. It will be understood that the function blocks illustrated in FIG. 1, including the advanced control block 38, can be executed by the controller 11 or, alternatively, can be located in and executed by any other processing device, such as one of the workstations 13 or even one of the field devices 19-22.

Figure 2:
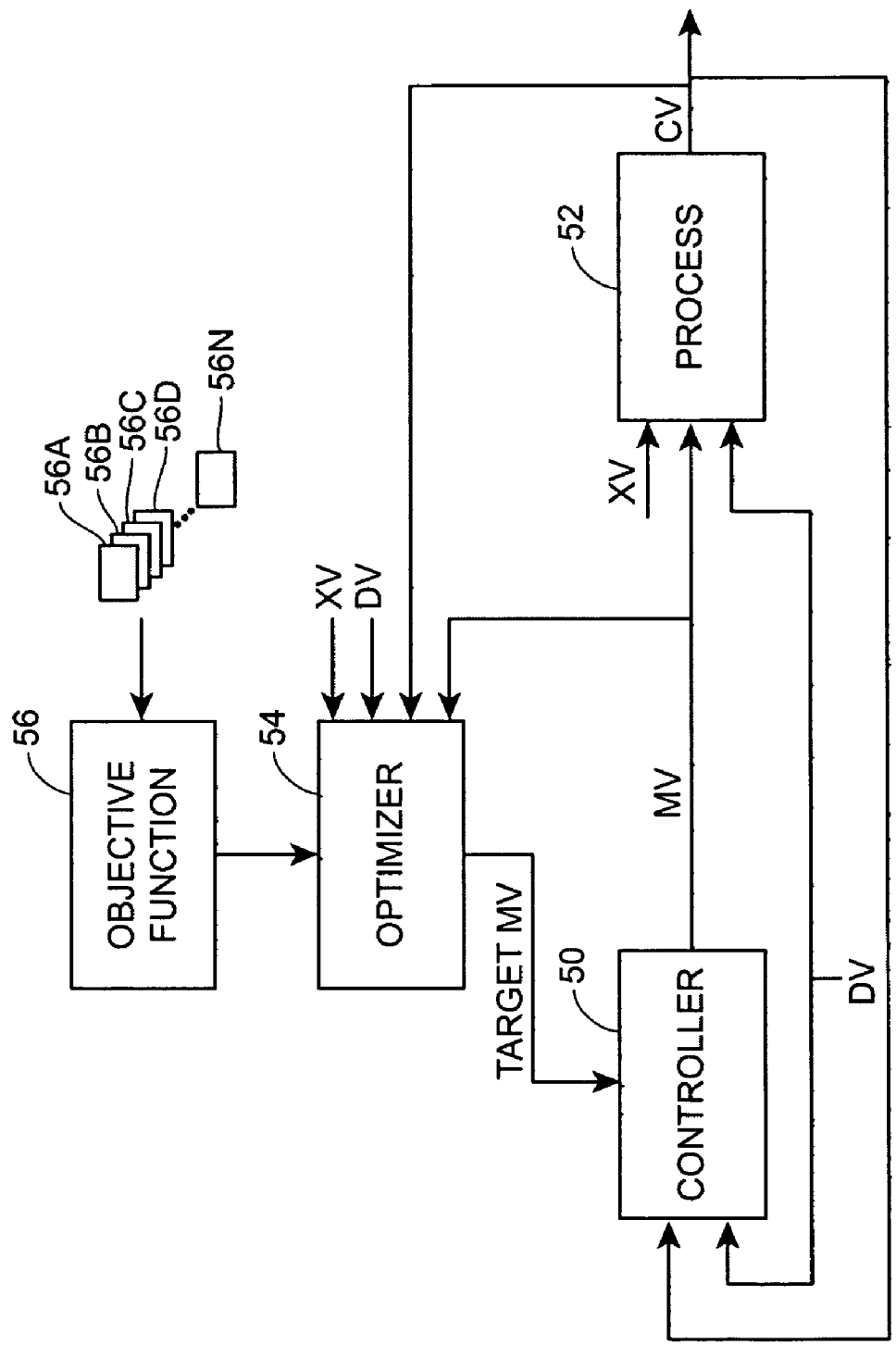
FIG. 2 is a block diagram of the advanced controller function block of FIG. 1 having an integrated optimizer and controller.

FIG. 2 illustrates a simplified block diagram of a controller 50 connected to a process 52, wherein the controller 50 is configured to respond to target control signals developed by an optimizer 54 to perform optimized control of the process 52 using the immunological techniques described herein. In particular, the process 50, which in this example will be described as a power generation process (and more particularly as a coal burning power plant), but which could be any other process instead, receives a number of inputs including manipulated variable (MV) inputs (also referred to herein as control inputs), measurable disturbance variable (DV) inputs and unmeasured disturbance variable (XV) inputs. As is typical, the process 52 operates based on the MV, DV and XV inputs provided thereto to produce process outputs signals or controlled variable (CV) signals. The actual CV signals may be measured within the process 52 by, for example, sensors such as flow, pressure, temperature, oxygen, opacity, etc. sensors, located at appropriate positions within the process or plant 52. As illustrated in FIG. 2, the controller 50 receives an indication of the controlled variable CV signals and the measurable disturbance variable DV inputs, as well as a set of target manipulated variable signals provided by the optimizer 54, and uses these signals to produce the manipulated variable (MV) signals, which are control signals that control the process 52. Generally speaking the MV signals are produced by the controller 50 to drive the process 52 to an optimal steady state operation, as determined by predetermined optimization criteria provided to the optimizer 54.

As will be understood, in a multi-variable control situation, each of the manipulated, disturbance and controlled variable signals MV, DV, XV and CV may be modeled as a vector of signals, wherein:

MV=vector of controllable object inputs, where MV={mv1, mv2, ... mvn};
DV=vector of measured disturbances, where DV={dv1, dv2, ... dvn};
XV=vector of non-measured or overtly unconsidered disturbances, where XV={xv1, xv2, ... xvn}; and
CV=vector of process variable outputs, where CV={cv1, cv2, ..., cvm}.

In one example, such as in the case of the optimization of flue gas emission in a power boiler, the MV vector could include signals indicative of the degree of opening of the dampers in a boiler, and the oxygen content in the flue gas; the DV vector could include signals indicative of the boiler load and the speed of coal feeders; the XV vector could include signals representing or indicative of the calorific value, humidity, milling quality, etc. of the coal; and the CV vector could include signals indicative of the measured carbon monoxide (CO) content in flue gas, the oxygen content in flue gas, steam temperature, etc. Of course each of these vectors could include other signals and/or parameters when used in a power boiler, as well as when used in other types of processes, with the specifics of the process and the type and nature of control that is desired effecting the determination of the exact signals or parameters used in each vector.

Before describing the operation of the controller 50 and optimizer 54 of FIG. 2 in more detail, it will be helpful to generally describe the immunological response of a body, to which the operation of the controller 50 and optimizer 54 will be analogized. The purpose of the nervous system is to protect an organism from pathogens, which may be viruses, bacteria, parasites and other microorganisms that pose a threat to living organisms. In fact, the basic functionality of the immune system is to correctly detect and effectively eliminate pathogens, which are recognized by detectors, called lymphocytes. The structure of the lymphocytes represents a certain direct knowledge of the previous activities of the immune system with respect to the introduction of other pathogens. When viewing the structure of the immune system from the point of view of its usefulness for solving technical problems, it is especially interesting to look at B-lymphocytes, which participate in destroying pathogens using the antibodies produced by the lymphocytes themselves. As a result of recombination of the genes comprising a given species of lymphocytes, new, more effective generations of lymphocytes and therefore antibodies are created. Thus, the immune system evolves new lymphocytes over time in response to the introduction of specific pathogens, and then remembers these new lymphocytes in some manner to be used in response to the introduction of the same or similar pathogens in the future. Because of this feature, B-lymphocytes not only eliminate the pathogens, but also participate in the process of creating the immune memory, as every lymphocyte created and stored within the body provides a different "set of tools" for destroying pathogens. Of course, some lymphocytes can be more effective than others in combating a particular type of pathogen.

Moreover, in the organism, there are functioning T-lymphocytes, which constitute the first line of defense, and whose role is to detect pathogens and to stimulate the creation of the appropriate B-lymphocytes. The process of creating the immune memory is then based on a selection and reproduction of the most effective B-lymphocytes for a particular pathogen. In fact, one of the characteristic features of the immune memory is the existence of groups of cells of similar properties. In other words, lymphocytes with similar sets of tools are located very close to each other. Because of the positioning of the lymphocytes, when the organism is infected by pathogens, the defense action can involve an accordingly large group of similar lymphocytes which may be used or combined to produce new lymphocytes that operate effectively to destroy the pathogen.

Thus, as described above, the immunological system has the ability to acquire and raise its qualifications through learning and experience and can, in fact, develop new abilities, or lose previously obtained abilities. These learning and remembering features are generally well suited for solving various technical problems encountered in power engineering as well as other branches of the process control industry. In any event, as can be seen from the above description, a characteristic feature of a biological immune system is its ability to constantly learn or adapt in response to the introduction of pathogens. This process is connected with the so-called "primary immune reaction" which is related to the organism's response to a new, unknown pathogen. Generally speaking, the primary immune reaction corresponds to searching for lymphocytes with the best set of tools, i.e., the ones that best remove the threat. The primary reaction of the organism is usually slow, because the organism needs time to adapt or find and produce the lymphocytes which best eliminate the unknown pathogen. However, after a successful defense operation, the memory of the pathogen does not disappear, as the developed lymphocytes are retained. Because of this "memory," the reaction to a subsequent attack of the same pathogen is much faster and more effective. This reaction is the so-called "secondary immune reaction" which indicates that the immune system is equipped with the features of an adaptive system.

Thus, as will be understood from the above described features of the immune system and the description of its functions, the defense reaction of an organism is based on the production of lymphocytes from an appropriate group of stored or remember lymphocytes. However, in order to successfully manage the lymphocytes, their number cannot increase infinitely. Thanks to a competition mechanism, the structure of an immune memory is self-regulating, in which ineffective lymphocytes are removed, and new lymphocytes are created in their place. A simplified mechanism of managing the population of lymphocytes is presented in equation (1):

$$DDC=INC-DIC+RSC \quad (1)$$

wherein:

DDC—degree of diversity of cells;

INC—inflow of new cells;

DIC—death of ineffective cells; and

RSC—reproduction of stimulated cells.

With this background in mind, the basic principles of the immunological control technique described herein may generally be analogized to the immune response of a biological organism. However, it is first necessary to realize that each steady state operating point or operating state of the process 52 of FIG. 2 can be uniquely identified or modeled by a particular set of the vectors MV, DV, XV, CV, with these operating states being referred to herein as process control states. More particularly, based on the current condition of the process 52 and the equipment therein, a particular set of steady state MV, DV and XV inputs (which are the control and disturbance inputs to the process 52) will result in the process 52 producing a particular set of CV signals as process outputs. Of course, the CV signals produced as a result of a particular set of MV, DV and XV inputs may change over time as the process equipment within the process 52 changes (e.g., deteriorates, experiences buildup of combustion byproducts, etc.). None-the-less, each actually obtained set of MV, DV, XV and CV signals uniquely stores, represents or is indicative of a model of the process 52 at the time that the process 52 experienced this particular combination of steady state signals and parameter values. Therefore, in analogizing to the biological context, each particular set of the MV, CV, DV, CV vectors or signals (i.e., each process control state) will be referred to herein as a lymphocyte, which can be understood to be a particular and previously experienced process steady state operating condition.

As will also be understood, certain lymphocytes or steady state process control states may be characterized as being better than others, based on the criteria being used to judge a good process result or operating condition from a bad process result or operating condition. For example, a particular process control state or lymphocyte MV1, DV1, XV1, CV1 may result in a large amount of flue gas emissions (as measured by, for example, an opacity sensor) and may also result in a low efficiency of combustion. On the other hand, another process control state or lymphocyte MV2, DV2, XV2, CV2 may result in a low opacity, but only average efficiency, while a still further process control state or lymphocyte MV3, DV3, XV3, CV3 may result in a low opacity and a high efficiency, which is the most desirable condition, all other things being equal. When possible, it is therefore desirable to move the process 52 to the third steady state operating condition (process control state) represented by lymphocyte MV3, DV3, XV3, CV3 when the process 52 is at the steady state condition represented by either of the first two lymphocytes or process control states. This example is, of course, simplistic in nature, it being understood that the technique of determining "good" and "bad" lymphocytes can be performed in a more rigorous mathematical manner using, for example, one or more mathematically defined optimization criteria, such as those defined by objective functions within an LP optimization technique. In particular, using an optimization criteria that defines the preferred states of the vectors MV and CV with respect to one another as well as with respect to desired operating points or set points, enables each lymphocyte or process control state to be assigned a quality factor.

With this understanding in mind, the immunological based control and optimization technique may generally be described as running the process 52 during normal operation and storing various different lymphocytes (MV, DV, XV, CV vectors) actually detected during the operation of the process 52. At this point or during this time, the process may be controlled in any desired manner using, for example, single-loop proportional-integral-derivative (PID) control, multivariable control, etc. However, after a certain number of lymphocytes have been detected and stored in a memory, the optimizer 54 may then effectively optimize the steady state process operating condition and additionally may quickly respond to a significant change in the process inputs (e.g., to a significant change in the process disturbance inputs DV and XV) using the stored lymphocytes. In particular, when the process 52 is operating at a steady state condition (i.e., without a significant change in the DV and XV vectors), the control technique performs stochastic optimization to determine a "better" lymphocyte or operating condition of the process 52 to thereby perform optimized control. Basically, during this stochastic optimization technique, the optimizer 54 develops sets of new target control signals (target MV signals) which the optimizer 54 provides to the controller 50. The controller 50 operates using each of the provided sets of target MV signals to control the process 52 in a manner that allows the controller 50 to produce the target MV signals as the actual MV signals being provided to the process 52. In one case, the controller 50 may simply immediately use the target MV signals as the actual MV signals provided to the process 52. However, in many cases, the controller may 50 may need to move the actual MV signals over time to match the target MV signals so as not to unduly upset the process 52 and so as to prevent one or more of the process outputs or CV signals from exceeding a limit due to the MV signal transition. In any event, the controller 50 produces different control (MV) signals over time to reach the target MV signals and thereby moves the process 52 to a new steady state condition.

The optimizer 54 may analyze or determine the relative goodness or badness of this new process steady state condition using an objective function 56 which may be one of a number of objective functions selected by a user (as illustrated by the different objective functions 56A, 56B, ..., 56N shown in FIG. 2). In this manner, a user may specify the optimization conditions or criteria with which to evaluate each of the process control state or lymphocyte. Based on this optimality analysis, the optimizer 54 may periodically determine a new set of target MV signals to use in reaching a process control state that is predicted to be more optimal than the current state, based on the selected objective function. Here, each process control state is analogous to a B-lymphocyte described in the biological context. Of course, each new process control state or lymphocyte determined during this stochastic optimization process may be stored as a new lymphocyte for later use by the control and optimization system.

Moreover, when the process 52 undergoes a significant change, as determined by a change to one or more of the disturbance vectors DV and/or XV, the optimizer 54 begins the process of determining a new optimal lymphocyte or process control state at which to run the process 52 based on the new set of process input conditions. Such a change is analogous to the situation in the biological context in which a pathogen is introduced into a biological system. In particular, when such a change in the disturbance variables is detected, the optimizer 54 first determines or attempts to predict the best one of the set of stored lymphocytes to use as a result of the process change, e.g., the new set of disturbance variables (DVs). This feature is analogous to the operation of T-lymphocytes in the biological context, as this response represents an attempt to determine which of the known or previously experienced process plant conditions (lymphocytes) is the best estimated starting point from which to respond to the new process condition, i.e., which lymphocyte is estimated to be the closest to the as yet undetermined optimal operating point of the process 52 and thus to be used as an initial response to the new or changed process input conditions.

It is important to note, however, that if the changed process input conditions include a set of inputs DV and XV (the pathogen) which are significantly different than any set of inputs (or pathogen) which was previously experienced by the process 52, the stored lymphocyte that is determine to best react to or control the process in response to such a new set of inputs DV, XV may not be very optimal at all, which may result in the optimizer 54 and controller 50 taking a longer period of time to react to the process input change (pathogen) in a manner that returns the process 52 to a steady state condition, and from there to an optimal process operating condition in response to the new set of process inputs. Because the optimizer 54 and the controller 50 use the lymphocytes stored in memory to react to new process input conditions, the larger the number of lymphocytes stored in the memory, the better the optimizer 54 and the controller 50 are able to respond to the process input changes (i.e., to the introduction of a new pathogen) in a manner that quickly returns the process 52 to an optimal steady state operating condition, as the more likely it is that the optimizer 54 will be able to find a starting lymphocyte that is "close" to the optimal lymphocyte for the new process input conditions.

Figure 3:
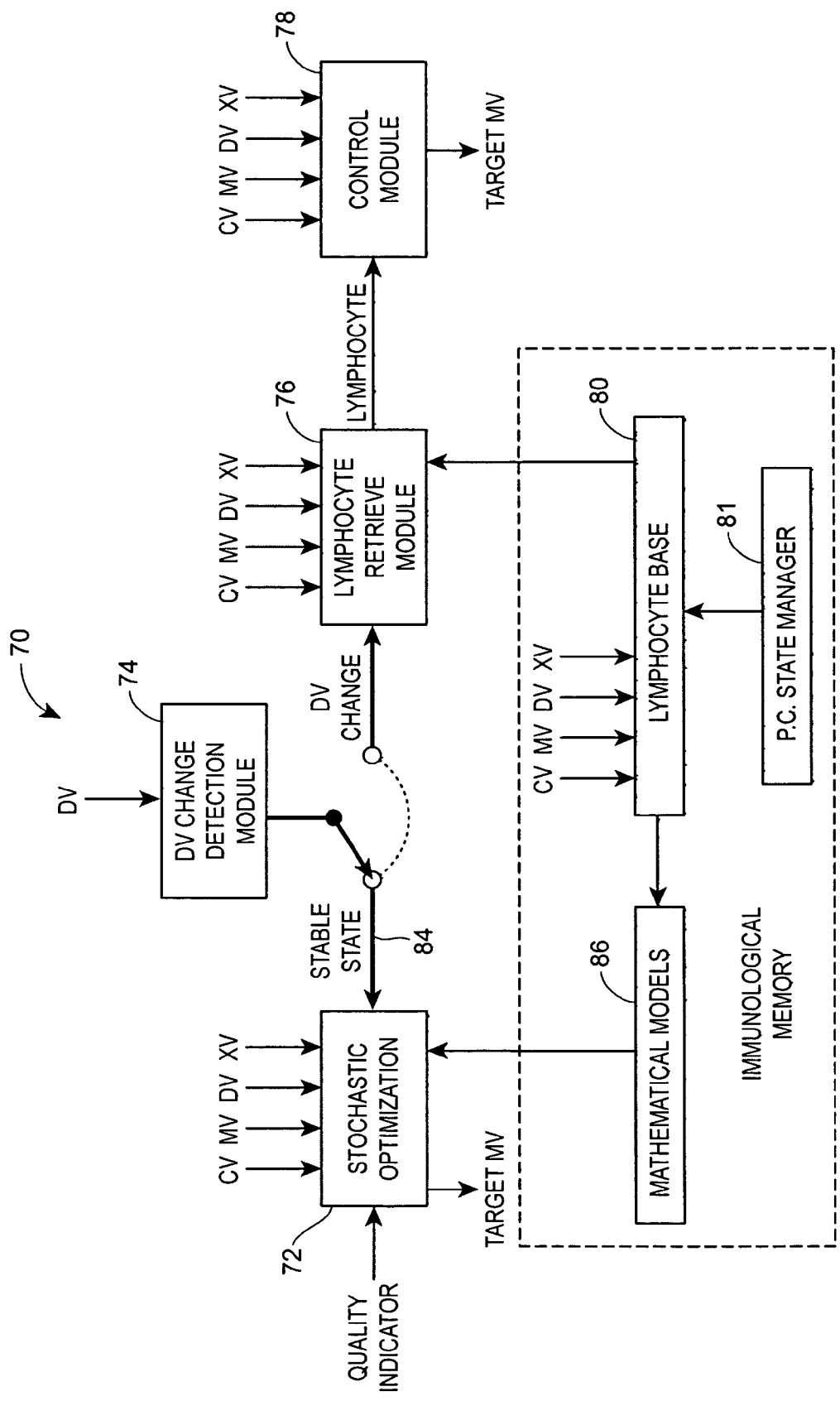
FIG. 3 is a block diagram of an artificial immune system based controller and optimizer, illustrating one manner of implementing the integrated optimizer and controller of FIG. 2.

FIG. 3 illustrates an optimization system 70 that uses the general principles discussed above to perform optimized control in a process plant, such as in a power plant. In particular, the system of FIG. 3 may be implemented as the optimizer 54 of FIG. 2, or as a combination of the controller 50 and the optimizer 54 of FIG. 2 and, in either case, may be implemented as the advanced control block 38 of FIG. 1. Generally speaking, the system 70 uses immunological concepts to control the process 52 in an optimal manner in response to changing conditions within the process plant 52, i.e., in response to changes in the measurable disturbance variables (DVs) and the un-measured disturbance variables (XVs).

As illustrated in FIG. 3, the optimization system 70 includes a stochastic optimization block 72, a DV change detection module 74, a model retrieve module 76, a control module 78 and a memory module 80 which includes a process control state manager 81. Generally speaking, the system 70 operates in one of two different modes, including a stochastic optimization mode and a regulation mode. The optimization system 70 generally operates in the stochastic optimization mode when the process 52 is already in a steady state condition, e.g., when the DV and XV inputs remain constant or nearly constant, and with a given set of MV control signals producing a given set of process variable CV outputs.

During this mode of operation, the DV change detection module 74 energizes or enables the stochastic optimization block 72 to operate to develop target MV signals (i.e., target control signals), as indicted by the position of the switch 84 in FIG. 3. The optimization block 72 performs stochastic optimization by changing the target MV vector slightly using, for example, any desired stochastic optimization technique, and determining the change in the CV vector as a result of this change in the control inputs. The optimization block 72 then analyzes whether better or more optimal control is obtained by the new set of target MV signals based on a preset or predetermined optimization criterion, such as that defined by an LP objective function (which may be the objective function 56 of FIG. 2.) During the stochastic optimization mode, the stochastic optimization block 72 generally iterates around a particular operating point or lymphocyte by changing the MV signals, the application of which to the process changes the CV signals, in an attempt to determine a local optimal operating point for the process 52 in which the DV and XV inputs are generally fixed or constant. However, over the course of time, the stochastic optimization block 72 may move to a non-local operating point that is more optimal, again using any desired stochastic iteration technique. During this iteration process, each of the steady state operating points or process control states (as defined by a set of MV, DV, XV and CV vectors) is stored in the memory 80 as a lymphocyte for possible use in the future.

Here, it should be noted that while the CV, DV and MV vectors are generally measurable or known at the time a particular lymphocyte is stored, the XV vector values of a particular lymphocyte may never be known and/or may be measured or determined at a later time and then stored in the memory 80 at that later time. For example, an XV vector variable indicative of coal moisture or other coal quality parameters for the coal used in a power generation plant (which quality parameters are typically determined by lab analysis) may be determined after the coal has been burned or used in a plant. Thus, the lymphocyte that results based on the use of the coal (and other process conditions) is actually determined and stored in the memory 80 prior to these XV variables being determined or known. In these cases, the XV vector values that are later known or determined may be stored in the appropriate lymphocytes in the memory 80 at the later time, and initially may be stored as in indicator of specific measurement to be used, e.g., the lot number of the coal, the time that the coal is used, etc. In some cases, an XV vector variable may never be determined exactly, but a generic indicator or placeholder for that XV vector variable may still be stored simply for comparison to other lymphocytes (i.e., to distinguish one lymphocyte from another in which the only difference in the inputs may be one of the XV variables). Additionally, one or more of the XV variable vectors may be used in some cases, to determine whether a particular lymphocyte is optimal in some manner, such as compared to other lymphocytes stored in the memory 80.

In any event, when the process input conditions change significantly, as evidenced by, for example, a significant change in the DV and/or XV variables, the DV change detection module 74 recognizes this change and causes the optimization system 70 to enter into the regulation mode, by providing control via the switch 84 to the lymphocyte retrieve module 76. Generally speaking, the DV change detection module 74 observes the measured disturbance variables DV and determines, based on significant changes in one or more of these disturbance variables, when the process 52 is undergoing or has undergone a significant change. If desired, however, the detection module 74 may observe other variables that indicate a changed process condition, such as a change in one or more set points used in controlling the process, a change in the objective function used to evaluate the process optimization, etc. To implement this general procedure, the DV change detection module 74 monitors changes in the DV vector to detect changes in the process 52 which indicate a changed process condition significant enough to switch the control system between the two operating modes, i.e., from the stochastic optimization mode (in which the DV vector is generally at a steady state) to the regulation mode (in which the DV change is occurring or has recently occurred). Generally speaking, the DV change detection module 74 serves the role of a T-type lymphocyte in the biological context, as the detection module 74 detects changes in the system (pathogens) and initializes the "immune reaction."

During the regulation mode, the optimization system 70 operates to react to a change in the DV and or the XV variables to find a new steady state operating point for the process 52, as quickly as possible, from which to again perform stochastic optimization. In other words, during the regulation mode, the optimization system 70 responds to changed process conditions, i.e., new DV and XV vectors, to determine a new operating point from which to perform process optimization. To provide a quick response, the lymphocyte retrieve module 76, once initialized, determines and selects a lymphocyte stored in the memory 80 that best fits the newly detected process conditions, and then provides this lymphocyte to the control module 78. In particular, each of the lymphocytes stored within the memory 80 represents a previous condition of the process 52 as actually measured or observed during process operation. Thus, to drive the process 52 in response to a new set of inputs (i.e., the DV and XV inputs), the lymphocyte retrieve module 76 searches the memory 80 for one or more previously stored lymphocytes which are "close" to the new process condition, in terms of the DV and XV vectors. Of course, this closeness may be determined, measured or judged in any desired manner, such as using least squares fit methods, regression analysis, etc. In any event, the lymphocyte retrieve module 76 may compare the new DV and XV vectors (to the extent the XV vectors are know) of the new or changed process control state to the DV and possibly XV vectors of at least some of the lymphocytes stored in the memory 80 to determine one or more of the lymphocytes stored in the memory 80 that represent a previously experienced process control state that is closest or at least close to the new process control state (in terms of disturbance inputs) and which may be an acceptable process state condition in terms of optimality. The lymphocyte retrieve module 76 may then provide these one or more lymphocytes to the control module 78 which uses these lymphocytes to determine a new set of target manipulated variables (target MV signals) to provide to the process controller. The control module 78 may simply use the actual MV signals of the one of the retrieved lymphocytes, or may perform interpolation or some other mathematical averaging function on the MV signals of multiple lymphocytes, and may also interpolate or otherwise change the MV signals of the retrieved one or more lymphocytes based on the differences between the disturbance input conditions of the retrieved lymphocyte(s) and the disturbance input conditions of the new or changed process control state to develop the new set of target MV signals.

Thus, the task of the lymphocyte retrieve module 76 is to search the knowledge base for an optimal or best MV vector, based on the current or newly detected DV, CV and indirectly XV vectors to use in controlling the process 52. In one embodiment, to perform this task, the retrieve module 76 searches the memory 80 for a lymphocyte which will be a best fit for driving the process 52 to on optimal steady state condition in response to the new DV and possibly XV vectors. Once the lymphocyte retrieve module 76 determines an optimal lymphocyte to use based on the previously detected lymphocytes stored in the memory 80, the module 76 provides this lymphocyte to the control unit 78. The control module 78 then operates, based on the current set of CV, MV, DV and XV vectors, to produce a target MV which can be used in the controller 50 of FIG. 2 to move the process 52 to the new and more optimal process condition. Of course, the ability of the lymphocyte retrieve module 76 to determine a lymphocyte that will cause the process 52 to move toward a new optimal condition (i.e., an optimal condition in light of the new disturbance vectors DV and XV) will be directly effected by the number and variability of lymphocytes actually stored in the memory 80. That is, generally speaking, the more lymphocytes stored in the memory 80, the better chance that a lymphocyte that is close to the new and as of yet undetermined optimal operating condition, will be found. Likewise, the greater the ranges of the various vector values within the various lymphocytes that are stored in the memory 80, the more likely it is that the optimization system 70 will be able to find a stored lymphocyte that is "close" to the new and as of yet underdetermined optimal operating point of the process 52 with the changed DV and XV disturbance variables. Using a lymphocyte that is "close" to the new process condition, will generally result in a quicker operation of the optimization system 70 in returning the process 52 to an optimal operating condition (as defined by, for example, the objective function).

Of course, the control module 78 determines a new target MV vector from the lymphocyte retrieved by the unit 76 and, if desired, this MV vector may be the MV vector of the retrieved lymphocyte. However, this target MV vector may not actually be attainable by the controller, as the DV and XV vectors within the process operation may be different than the DV and XV vectors of the lymphocyte retrieved by the module 76. Thus, the control module 78 may perform multivariable interpolation or may perform some other mathematical operation to develop a new MV target vector from the MV vector of the retrieved lymphocyte, generally based on the difference between the DV and XV vectors of the current or newly changed process control state and the DV and XV vectors of the retrieved lymphocyte. Moreover, the control module 78 may change the target MV vectors 78 over time in response to process conditions or process measurements.

When the control module 78 has operated to move the process 52 back to a steady state operating condition based on the target MV vector produced by the control module 78, the DV change detection module 74 may switch the operation of the optimization system 70 back to the stochastic optimization mode to enable the optimizer block 72 to determine a more optimal or better operating point. Thus, the purpose of the lymphocyte retrieve module 76 and the control module 78 is to, as quickly as possible, return or drive the process 52 back to an operating state that is near optimal or that is at least acceptable, in response to a process upset or change. Thereafter, the stochastic optimization block 72 may operate, on a somewhat slower basis, to find a better or more optimal operating point using stochastic optimization techniques.

Moreover, it will be noted that the controller, such as the controller 50 of FIG. 2, which receives the set of target MV signals and uses these target signals to control the process 52, may be any desired type of controller, such as a PID controller, a fuzzy logic controller, a neural network controller, an MPC controller, etc. In fact, the controller 50 may implement a plurality of single loop control routines, in which case the target control signal vector (the target MV vector) may include a target control signal value for each of the single loop control routines. On the other hand, the controller 50 may implement a multiple-input/multiple-output control routine, in which case the target control signal vector (the target MV vector) may include a target control signal value for each of the inputs or outputs of the multiple-input/multiple-output control routine. Still further, as indicated above, the controller 50 of FIG. 2 may immediately output the target MV signals as process control inputs (in which case the control module block 78 may operate as the controller 50), or may determine an appropriate manner of moving from the current control signals (MV signals) being provided to the process 52 to the set of target control signals, so as to not unduly upset the process 52 or cause one or more process outputs to exceed a preset limit.

It will be noted that, during operation, the stochastic optimization block 72 may use the lymphocytes stored in the memory 80 and one or more mathematical models stored in a memory 86 to perform stochastic optimization. In particular, the mathematical models 86 may be pre-stored in the memory 80 to represent general operations of the process 52. In this case, for example, the mathematical models 86 may be first order or first order plus derivative models, and may be used to predict the operation of the process 52 in responses to new MV signals. If desired, however, the mathematical models 86 may be developed from the actual lymphocytes stored in the memory 80 during operation of the process 52. In this case, for example, a different mathematical model may be developed from or constructed on the basis of a single group of lymphocytes which are disposed close to one another in a statistical sense. In either case, the mathematical models may be used to assist the stochastic optimization block 72 in developing new target MV signals in order to find a new or more optimal operating point of the process, it being understood that the mathematical models 86 may be used to simulate the process operation.

It will be understood from this discussion that each lymphocyte actually represents, in some manner, a process operating condition or a snap-shot of a process model. However, the usefulness of particular lymphocytes may deteriorate over time as physical changes which are not represented by any of the disturbance variables DV or XV or the process variables CV occur within the process. Such changes can include deterioration of equipment, buildup of combustion by-products, etc. As a result, the memory 80 includes the process control state manager 81, which operates to control or remove lymphocytes from the memory 80, either when too many lymphocytes are stored in the memory 80, or when it is recognized that some lymphocytes may not be very good indicators or representations of current process conditions. Generally speaking, the memory or lymphocyte base may be managed based on time factors (i.e., an indication of when a lymphocyte was stored in the memory may be use to determine if the lymphocyte should be discarded from future use), or based on use (i.e., the number of times that a lymphocyte as been used by the lymphocyte retrieve module 76 or the stochastic optimization block 72), or both (e.g., the length of time that a lymphocyte has been used by the retrieve module 76 or the stochastic optimization block 72). Of course, other criteria could be used instead or in addition to determine when to remove a particular lymphocyte from the memory 80.

Still further, an example of an optimization algorithm that may be used to minimize the objective function defined for the MV and CV variables and that may be used by the optimizer 54 of FIG. 2 is provided below in the form of equation (2):

$$J = \sum_{k=1}^{N_m} [a_k \cdot |mv_k - mvsp_k| + b_k \cdot (mv_k - mvsp_k)^2] + \sum_{k=1}^{N_c} [c_k \cdot |cv_k - cvsp_k| + d_k \cdot (cv_k - cvsp_k)^2] \quad (2)$$

where:
$mv_k$—value of the kth element of the MV vector;
$cv_k$—value of the kth element of the CV vector;
$N_m$—number of elements in the MV vector;
$N_c$—number of elements in the CV vector;
$mvsp_k$—set point value for kth element of the MV vector;
$cvsp_k$—set point value for kth element of the CV vector; and
$a_k, b_k, c_k, d_k$—weights of selected elements of objective functions.

Of course, equation (2) represents only one example of an optimization routine or criteria that could be implemented in the optimization module 72 or the control module 78, it being understood that other optimization criteria could be used instead, including other linear programming (LP) optimization algorithms as well other non-LP types of optimization algorithms.

Employing once again, the analogy to the immune system, it will be understood that the value of the objective function associated with any particular lymphocyte (i.e., steady state process operating condition) is reversely proportional to the health of an organism. Thus, by minimizing the objective function, the "good" condition of the organism is maximized. In the optimization algorithm above, it is assumed that each lymphocyte is defined by a set {MV,DV,CV}, where CV is the measured reaction of the process to the stimulation of MV, DV, XV. Moreover, each pathogen is a set {DV, XV}. However, it must be remembered that the XV vector includes non-measurable or overtly unconsidered variables, and thus the detection of the existence of a new pathogen is based on detecting the change of the DV vector. Thus, applying the analogy to the immune system, the DV change detection module 74 which detects the DV change, fulfills the role of a T-lymphocyte in a biological system.

Using the analogy of the structure of a lymphocyte and a pathogen, it is possible to discuss the manner in which the optimization system 70 reacts to an unknown pathogen (a new set of DV and XV variables), which represent the "primary reaction" of the artificial immune system to a process change. As in a biological immune system, this primary reaction will represent operation of the optimizer 70 for the initial period of operation in response to a new pathogen, and will correspond to the a learning phase in which the optimizer 70 learns an appropriate response. Thus, when the DV vector changes, and no lymphocyte is found in the memory 80 which would be suitable or "remember" how to react to a new pathogen (i.e., the new DV condition) because there was no lymphocyte in the memory 80 with a similar DV vector in relation to the DV vector of the pathogen, the optimization system 70 begins to search for an optimal solution using the method of stochastic optimization. In this context, an optimal solution is an MV vector, which in combination with the DV and XV vectors, produces a CV vector which minimizes the objective function when applied to the set of MV, CV, DV and XV vectors. Before the optimal solution is reached however, the optimization system 70 will carry out numerous tests bringing the solution closer to the ultimate minimum of the objective function. Every test of this kind produces a new lymphocyte which may be stored in the memory 80, and so a result of the primary reaction to a new pathogen results in the stored base of lymphocytes increasing. Generally speaking, the largest number of lymphocytes will be created around the optimal lymphocyte in a vector space defined by MV, DV, XV and CV, and thus, lymphocytes with similar features will be concentrated "close" to each other in this space. This feature makes the structure of the immune memory resemble an idiotypical structure. In any event, this self-learning feature of the artificial immune system and used by the optimizer system 70 reduces or eliminates the need for qualified engineering personnel to conduct expert tests on a process, which reduces the cost of installation labor.

Moreover, each concentration of lymphocytes of this type may be used by the self-updating local mathematical model unit 86 to produce a local mathematical model representing the operation of the process, at least in this region of the vector space. These models may then be used in the stochastic optimization mode for simulation/prediction purposes and to define the distance between the pathogen and the lymphocyte, namely to assign a group of lymphocytes which should be used to eliminate or react to the pathogen. In one case, the stochastic optimization block 72 may choose a selected MV vector and use the mathematical models to predict the resulting CV vectors (given the DV and XV vectors currently associated with the process), and then analyze the optimality of this predicted solution using the objective function. On the other hand, if desired, the stochastic optimization block 72 may select a proposed or desired set of CV variables and use the models to determine the predicted set of MV variables which when input to the process, will produce this set of MV variables. The module 72 may then analyze the optimality of this predicted process control state using the objective function. When the stochastic optimization module 72 determines a solution that is predicted to be more optimal, it may provide the new set of MV variables as the target control signals to the controller, so as to move the process towards this predicted optimal point. Of course, the actual process control state that results (which can be stored as a new lymphocyte in the memory 80) may differ from the predicted state, and so the module 72 may repeat operation to determine a new predicted operating point that is more optimal.

As noted above, a pathogen is a set of vectors $\{DV, XV\}$. If the structure of a pathogen did not entail the vector XV, the selection of the group of lymphocytes which should be stimulated in response to a new pathogen would be based on defining which group of stored lymphocytes has a similar DV vector in relation to the pathogen. The additional vector XV complicates this task, as the optimization system 70 cannot really recognize the value of XV vector elements. However, the information within the XV vector is concealed in the mathematical model constructed in the group of similar lymphocytes as this model is based on the effect of this vector on the process. As an example, assume that there has been an attack of a pathogen, so the DV vector changed and perhaps the vector XV as well (although that change may not be known or measured). In response, the optimizer 70 chooses a group of lymphocytes for which the reaction of a linear model to the stimulation by the current MV vector is the closest to the current CV vector. Thus, a substantial advantage of the immunologically based optimizer described herein is its covert use of information on the concealed disturbances XV during the optimization of the process, such as the use of the calorific value and the humidity of coal, quality of milling, etc. within a combustion operation of a power plant.

Gradually, that is over time, the optimization system 70 will "learn" to react to most of the possible combinations of vectors DV and XV. At this time, the secondary immune reactions will dominate in response to a new pathogen, wherein as in the case of a biological immune reaction, the secondary response will be much faster and more effective than the primary response. For example, if the system was attacked by a pathogen, which is similar to a pathogen which was already once defeated as a result of primary response, the system will remember which lymphocyte it used to eliminate the pathogen. In other words the system learned which vector MV gives the best results for a given DV, XV set. A secondary defense reaction of the organism is to provide the object with a set of MV variables from the remembered lymphocyte knowing that this MV vector should lie close to the optimal solution. It is thus, a starting point of the stochastic optimization algorithm. Finding a new, optimal vector MV requires conducting a much smaller number of tests than in the case of the primary response. None-the-less, the conducted tests still increase the immune memory of the system, so that the system learns further how to effectively defeat pathogens. This sort of learning represents a perfecting of the basic knowledge acquired during the course of the primary reaction and updates the system in response to undetected changes in the process, such as process equipment deterioration.

Thus, it will be understood that the above described stochastic optimization is based on conducting tests during the ongoing or on-line operation of the process. Because each test is an observation of the output of a CV vector, as a result of changes of the MV vector, these changes are not purely random. Moreover, during the process of searching for the minimum of the objective function, it is useful to employ a mathematical model constructed on a group of lymphocytes with similar features. It should be remembered that, in order for the pathogens to be quickly and effectively eliminated, it is enough if they are similar to those which once attacked the system. Thus, as a result of an optimization procedure starting from one group of lymphocytes, a new group may be created. It will be seen that, if the system is to correctly react to pathogens not necessarily identical to those which it remembers, using the information from the model during the optimization process should only have a supportive role. Thus, stochastic optimization is based on determining the deviances of the MV vector, accordingly with the schedule of probability created on the basis of a mathematical model. Moreover, the mathematical models may be evolved over time as new and more recent lymphocytes are added to the memory 80 or knowledge base. In particular, an offspring model may inherit the features of a mother model, and thanks to the process of mutation (possibility of changing the direction of optimization), it is possible to create a new group of lymphocytes, namely to create a similar offspring model, but not identical to the mother model. At the same time during the entire operation of the optimization algorithm, the process of removing ineffective lymphocytes and replacing them with a new generation is conducted, which is compliant with the earlier mentioned ability of immune systems to self-organize (e.g., so that the population can not grow endlessly). Thus, ineffective or rarely used lymphocytes may be periodically removed from the memory 80. Generally speaking, however, the population of lymphocytes becomes increased as a result of the primary reaction (in which a large number of new lymphocytes is generally created during the learning process) and the secondary reaction (in which new lymphocytes are created as a result of recombination of the stimulated group of lymphocytes).

Thus, the application of the theory of artificial immune systems for plant optimization and control produces a self-regulating system, which when applied to a combustion based power plant, provides the principle advantages of (1) lowering the costs of plant operation through the optimization of the combustion process, with covert use of information on non-measurable or rarely measurable disturbances (e.g., fuel parameters, operative quality of carbon fuel milling, etc.), (2) lowering the costs of operation of a power plant through the reduction in time and labor of the highly qualified engineering staff, and (3) constant adaptation to new operational conditions.

The operational capabilities of the system described herein was verified by constructing a simulator of a power boiler. In this simulated system, the following parameters were used:

The MV group included:
  degree of opening of dampers controlling the air flow to the boiler (depending on the positioning of a damper in a boiler, six damper types: A, B, C, D, E, F were used), and
  oxygen content in flue gas.

The DV group consisted of:
  boiler load, and
  speed of coal feeders to each of the four mills.

The XV group consisted of:
  coal calorific value, and
  milling quality for each of the four mills.

The CV group consisted of:
  steam temperature on the left side of the boiler,
  steam temperature on the right side of the boiler,
  CO content in flue gas on the left side of the boiler,
  CO content in flue gas on the right side of the boiler,
  $NO_x$ content in flue gas on the left side of the boiler,
  $NO_x$ content in flue gas on the right side of the boiler, and
  difference in oxygen content between the left and right side of the boiler.

The objective of the system was to:
  maintain steam temperature at 540 deg C., (1004 deg F.),
  maintain a zero difference of oxygen content between the left and right side of the boiler,
  minimize CO emission,
  maintain $NO_x$ emission at a level which does not exceed 500 ppm, and
  minimize content of combustible parts in fly-ash and slag.

The obtained practical results of this simulations produced a reduction of $NO_x$ emission in a large energy installation by 10-25% and improved the efficiency of the combustion process by 0.1-1.0% which would lead to significant economic savings.

While the advanced control and optimization system has been illustrated herein as having an optimizer located within the same module or function block and therefore executed in the same device as the controller, it is also possible to implement the optimizer 70 in a separate device. In particular, the optimizer 70 may be located in a different device, such as in one of the user workstations 13 and communicate with the controller as described in conjunction with FIG. 2 during each execution or scan of the controller to calculate and provide the target manipulated variables to the controller. Of course, any desired interface, including a known OPC interface, may be used to provide the communication interface between the controller and the optimizer within the workstation or other computer that implements or executes the optimizer. As in the embodiment described with respect to FIG. 2, the optimizer 54 and the controller 50 may but need not communicate with each other during each scan cycle of the controller 50 to perform integrated optimized control. In any case, any desired type of controller may be used to perform control in response to the target MV signals.

While the advanced control block and other blocks and routines described herein have been described herein as being used in conjunction with Fieldbus and standard 4-20 ma devices, they can, of course, be implemented using any other process control communication protocol or programming environment and may be used with any other types of devices, function blocks or controllers. Although the advanced control blocks and the associated generation and testing routines described herein are preferably implemented in software, they may be implemented in hardware, firmware, etc., and may be executed by any other processor associated with a process control system. Thus, the optimizer and controller routines described herein may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc. (which is viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control system for controlling a process, comprising:
  a controller that uses a set of target control signal values to produce one or more process control signals for use in controlling one or more field devices within the process; and
  an optimizer communicatively coupled to the controller to develop the set of target control signal values during on-line operation of the process, the on-line operation of the process including a stochastic optimization operation mode corresponding to a stead state operation of the process and a regulation operation mode, and the target control signal values including target values for a set of manipulated control variables (MVs), the optimizer including:
    a memory for storing a plurality of process control states, each of the plurality of process control states including values for a set of process input variables and values for a set of process output variables associated with an actual operating condition previously experienced in controlling the process during the on-line operation of the process, the set of process input variables including at least the set of MVs and a set of disturbance variables (DVs);

an optimization unit communicatively coupled to the memory to use the stored plurality of process control states to develop a series of the target control signal values for use by the controller during the stochastic optimization operation mode of the process to iteratively drive the process towards an optimal process operating condition associated with the process steady state operation, wherein the process steady state operation corresponds to a DV steady state condition of at least one of the set of disturbance variables;

a response unit communicatively coupled to the memory and operating the regulation operation mode of the process to respond to a change of the at least one of the set of disturbance variables from the DV steady state condition more quickly than the stochastic optimization operation mode is able to respond to the change by selecting a subset of one or more of the stored plurality of process control states and using the selected subset of one or more of the stored plurality of process control states to produce a new set of target control signal values for use by the controller to drive the process towards a new optimal process operating condition associated with a new process steady state operation, the selected subset of the one or more of the stored plurality of process control states having one or more values that are closer to corresponding one or more values of a process control state corresponding to the change than are one or more values of another subset of the one or more of the stored plurality of process control states; and a change detection unit responsive to one or more process inputs to:
detect the change and based on the detected change, cause the process to exit the stochastic optimization operation mode and enter the regulation operation mode, and
cause the process to exit the regulation operation mode and return to the stochastic optimization operation mode after the process has been driven towards the new optimal process operating condition.

2. The process control system of claim 1, wherein the values for the set of process output variables for a particular process control state includes indications of measured process output variable values that result from application of the set of process input variable values of the particular process control state to the process.

3. The process control system of claim 2, wherein each indication of a measured process output variable value for the particular process control state is an indication of a steady state process variable that results from application of the set of process input variable values of the particular process control state to the process.

4. The process control system of claim 1, wherein the set of disturbance variables include disturbance inputs measured or determined off-line from operation of the process.

5. The process control system of claim 1, wherein the optimizer includes a model creation unit that creates one or more models of the process from one or more of the stored process control states.

6. The process control system of claim 1, wherein the optimization unit includes an objective function and uses the objective function to determine a comparative optimality of two or more process control states to develop the set of target control signals.

7. The process control system of claim 6, wherein the objective function is user-definable.

8. The process control system of claim 1, further including a process control state manager, which operates to control the number of process control states stored in the memory.

9. The process control system of claim 8, wherein the process control state manager removes one or more of the stored process control states based on the length of time that the one or more of the process control states has been stored in the memory.

10. The process control system of claim 8, wherein the process control state manager removes one or more of the stored process control states based on an indication of the usage of the one or more of the process control states by the optimization unit or the response unit.

11. The process control system of claim 1, wherein the set of target control signal values includes signals indicative of one or more of the process control signals to be output by the controller at some point in the future.

12. The process control system of claim 1, wherein the controller is a proportional-integral-derivative controller.

13. The process control system of claim 1, wherein the controller implements a plurality of single loop control routines and wherein the set of target control signal values includes a target control signal value for each of the single loop control routines.

14. The process control system of claim 1, wherein controller implements a multiple-input/multiple-output control routine and wherein the set of target control signal values includes a target control signal value for each of the inputs or outputs of the multiple-input/multiple-output control routine.

15. The process control system of claim 1, wherein a closeness between the one or more values of the selected subset of the one or more stored plurality of process control states and the one or more values of the process control state corresponding to the change are determined based on at least one of: a least squares fit method or a regression analysis.

16. The process control system of claim 1, wherein each member of the set of disturbance variables is one of a measured disturbance variable or an unmeasured disturbance variable.

17. A method of controlling a process, comprising, during on-line operation of the process:
determining values for a set of process input variables and values for a set of process output variables at multiple times during the on-line operation of the process to determine a multiplicity of process control states, each of the multiplicity of process control states including values for the set of process input variables and values for the set of process output variables associated with an actual operating condition previously experienced in controlling the process, and the set of process input variables including a set of manipulated control variables (MVs) and a set of disturbance variables (DVs);
storing an indication of each of the multiplicity of process control states;
operating the process at a process steady state condition by using a stochastic operation mode of the on-line operation, including optimizing the operation of the process by periodically providing new control inputs to the process, the new control inputs configured to move the process to a more optimal process control state at process steady state condition, and the process steady state condition corresponding to a DV steady state of at least one of the set of disturbance variables;

detecting a change in one or more process disturbances that causes the at least one of the set of disturbance variables to exit the DV steady state so that the process no longer operates at the process steady state condition;

based on the detected change, ceasing the operation of the process in the stochastic operation mode and instead operating the process in a regulation operation mode of the on-line operation to respond to the detected change more quickly than the stochastic operation mode by:

determining a set of control inputs to be provided to the process based on a subset of one or more of the stored indications of the multiplicity of process control states to cause the process to operate at a new process steady state condition, the subset of the one or more of the stored indications of the multiplicity of process control states being closer to a process control state corresponding to the detected change than is another subset of the one or more of the stored indications of the multiplicity of process control states, and controlling the process using the set of control inputs to move the process towards a more optimal process control state at the new process steady state condition; and ceasing the operation of the process in the regulation operation mode and returning the process to operating in the stochastic operation mode after the process has moved towards the more optimal process control state at the new process steady state condition.

18. The method of claim 17, wherein each of the indications of each of the multiplicity of process control states includes values for the set of process output variables that result from the set of process input variable values being applied to the process.

19. The method of claim 18, wherein the set of process output variables values includes indications of measured steady state process variables that result from application of the set of process input variable values.

20. The method of claim 18, further including limiting a number of indications of process control states stored in the memory by removing one or more indications of process control states from the memory.

21. The method of claim 20, wherein removing one or more of the indications of the process control states from the memory includes removing the one or more indications of the process control states based on the length of time that the one or more indications of the process control states have been stored in the memory or based on an indication of the amount of usage of the one or more of the process control states in response to changes in the one or more process disturbances.

22. The method of claim 17, wherein optimizing the operation of the process includes using the stored indications of process control states to predict a new process control state and analyzing the optimality of the new process control state based on preset optimization criteria.

23. The method of claim 22, wherein analyzing the optimality of the new process control state base on preset optimization criteria includes using an objective function that includes factors related to one or more of the process output variables and to one or more of the process input variables to define the optimization criteria.

24. The method of claim 22, wherein optimizing the operation of the process includes developing a process model from the stored indications of process control states and predicting the new process control state using the developed process model.

25. The method of claim 17, wherein each of the indications of each of the multiplicity of process control states includes values for the set of process output variables that result from the set of process input variable values being applied to the process and wherein determining the set of control inputs to be provided to the process based on the subset of one or more of the stored indications of the multiplicity of process control states includes determining the set of control inputs based on at least some of the values for set of process input variables of the subset of one or more of the stored indications of the multiplicity of the process control states.

26. The method of claim 17, further comprising determining a closeness of the subset of the one or more of the stored indications of the process control states to the process control state corresponding to the detected change based on at least one of: a least squares fit method or a regression analysis.

27. The method of claim 17, wherein the set of disturbance variables includes at least one of: a measured disturbance variable or an unmeasured disturbance variable.

28. A method of controlling a process, comprising:

during on-line operation of the process, operating the process in one of a stochastic operation mode or a regulation operation mode, including:

operating the process in the stochastic operation mode while the process operates at a process steady state condition corresponding to a steady state of a disturbance variable corresponding to the process, including:

determining a multiplicity of process control, each of the multiplicity of process control states including a value for each of a set of process inputs and a set of process outputs that result from the set of process inputs being applied to the process;

storing an indication of each of the multiplicity of process control states in a memory; and iteratively moving the process towards one or more optimal process operating conditions of the process steady state condition by periodically changing the value of one or more of the set of process inputs;

monitoring a current state of the process to determine when the disturbance variable corresponding to the process experiences a change that causes the disturbance variable to exit the disturbance variable steady state and thereby cause the process to exit the process steady state condition; and when the process exits the process steady state condition, operating the process in the regulation operation mode, including:

determining a set of control inputs to be provided to the process based on a subset of one or more of the stored indications of the multiplicity of process control states to cause the process to operate at a new process steady state condition corresponding to a new steady state of the disturbance variable, the subset of the one or more of the stored indications of the multiplicity of process control states having one or more values that are closer to corresponding one or more values of a process control state corresponding to the change than are one or more values of another subset of the one or more of the stored indications of the multiplicity of process control states, and controlling the process using the determined set of control inputs to move the process towards a more optimal process control state at the new process steady state condition more quickly than the stochastic operation mode is able to move the process towards the more optimal process control state at the new process steady state condition; and operating the process in the stochastic operation mode at the new process steady state condition after the process has been moved towards the more optimal process control state at the new process stead state condition by the regulation operation mode.

29. The method of controlling a process of claim 28, wherein monitoring the current state of the process includes monitoring the set of process inputs provided to the process to determine a change in one or more of the set of process inputs provided to the process.

30. The method of controlling a process of claim 28, wherein each of the set of process inputs includes one or more disturbance inputs, the one or more disturbance inputs including the disturbance variable, and wherein monitoring the current state of the process includes monitoring the disturbance inputs applied to the process to determine a change in one or more disturbance inputs applied to the process.

31. The method of controlling a process of claim 28, wherein determining the set of control inputs to be provided to the process based on the subset of the one or more of the stored indications of the multiplicity of process control states includes comparing the corresponding one or more values of the process control state corresponding to the detected change to one or more values of the one or more of the stored indications of the multiplicity of process control states and determining the subset of the one or more of the stored indications of the multiplicity of process control states to use based on the comparison.

32. The method of controlling a process of claim 31, wherein comparing the one or more values of the process control state corresponding to the detected change to the one or more values of the stored indications of the multiplicity of process control states includes comparing the process inputs of the process control state corresponding to the detected change to the process inputs of the stored indications of at least some of the multiplicity of process control states.

33. The method of controlling a process of claim 31, wherein each of the set of process inputs for each process control state includes one or more process disturbance inputs and wherein comparing the corresponding one or more values of the process control state corresponding to the detected change to the one or more values of the stored indications of the multiplicity of process control states includes comparing the one or more process disturbance inputs of the process control state corresponding to the detected change to the one or more disturbance inputs of the stored indications of at least some of the multiplicity of process control states.

* * * * *

UNITED STATES PATENT AND TRADEMARK OFFICE
CERTIFICATE OF CORRECTION

| | |
|---|---|
| PATENT NO. | : 7,856,280 B2 |
| APPLICATION NO. | : 11/497839 |
| DATED | : December 21, 2010 |
| INVENTOR(S) | : Jeffrey J. Grott et al. |

Page 1 of 1

It is certified that error appears in the above-identified patent and that said Letters Patent is hereby corrected as shown below:

At Column 6, line 51, "criteria" should be -- criterion --.

At Column 12, line 24, "criteria" should be -- criterion --.

At Column 18, line 66, "the a" should be -- a --.

At Column 21, line 3, "can not" should be -- cannot --.

At Column 21, line 25, "was" should be -- were --.

At Column 21, line 58, "simulations" should be -- simulation --.

Signed and Sealed this
Fifth Day of July, 2011

David J. Kappos
*Director of the United States Patent and Trademark Office*